W. H. CRILLEY.
NUT REMOVING DEVICE.
APPLICATION FILED DEC. 22, 1910.
999,702.
Patented Aug. 1, 1911.
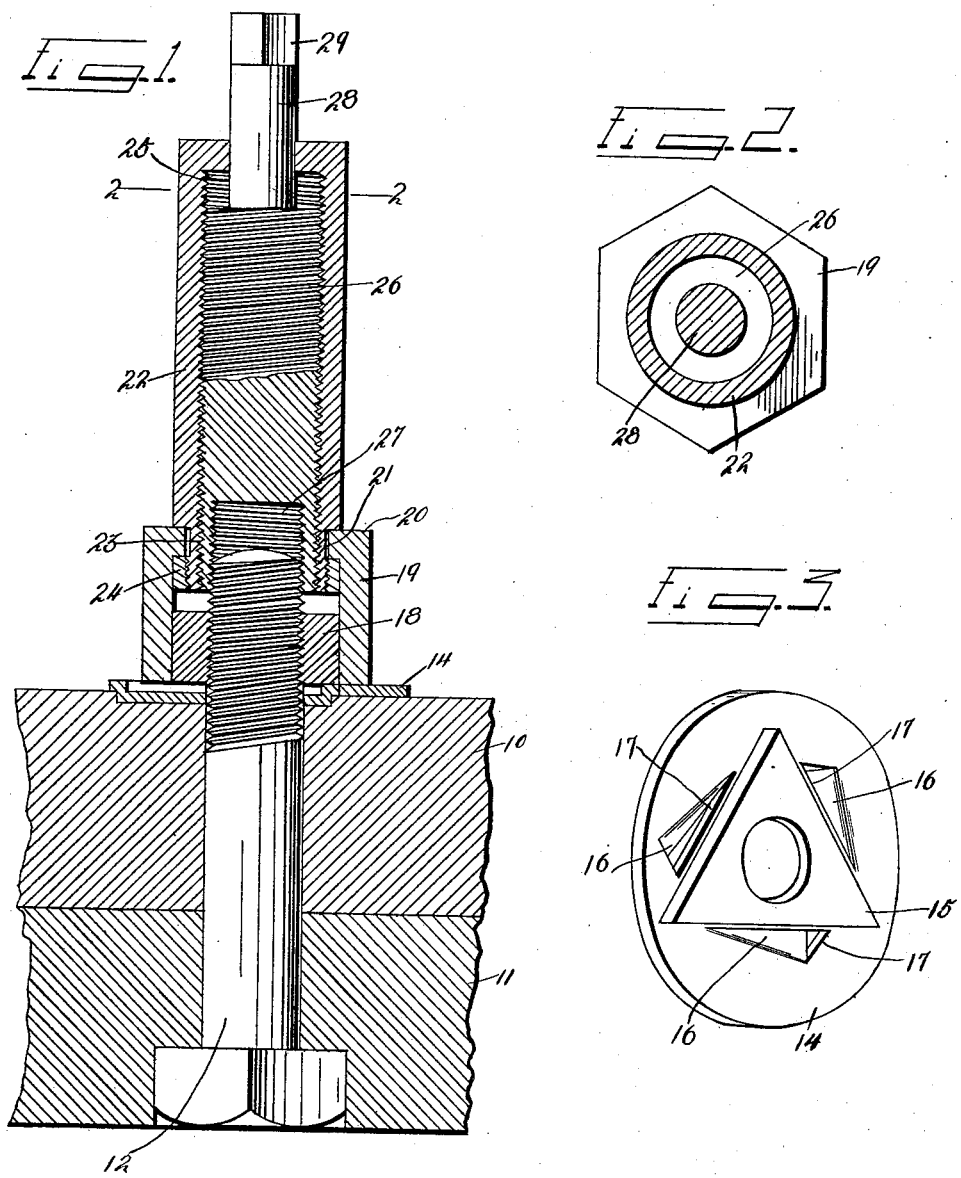
Witnesses
J. E. Strohl
Jos. J. O'Brien
Inventor
WALTER H. CRILLEY
By 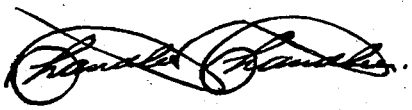
Attorneys
COLUMBIA PLANOGRAPH CO., WASHINGTON, D. C.

UNITED STATES PATENT OFFICE.

WALTER H. CRILLEY, OF SMITHTON, PENNSYLVANIA.

NUT-REMOVING DEVICE.

999,702.  Specification of Letters Patent.  Patented Aug. 1, 1911.

Application filed December 22, 1910. Serial No. 598,833.

*To all whom it may concern:*

Be it known that I, WALTER H. CRILLEY, a citizen of the United States, residing at Smithton, in the county of Westmoreland, State of Pennsylvania, have invented certain new and useful Improvements in Nut-Removing Devices; and I do hereby declare the following to be a full, clear, and exact description of the invention, such as will enable others skilled in the art to which it appertains to make and use the same.

This invention relates to improvements in devices for removing nuts from bolts which are locked to the bolts by means of washers having spring tongues thereon, and the leading object of the invention is to provide a device whereby the spring tongues can be forced out of their normal locking positions to permit of the ready removal of the nuts, and the device is particularly applicable for removing a nut secured in locking position by the spring washer set forth in my pending application, Serial Number 560,830.

With the above and other objects in view the invention consists in certain constructions, combinations and arrangements of parts, clearly described in the following specification and clearly illustrated in the accompanying drawings, in which:—

Figure 1 is a vertical sectional view taken through the device mounted in operative position on a nut and the threaded end of a bolt. Fig. 2 is a transverse sectional view taken on the line 2—2 of Fig. 1. Fig. 3 is a perspective view illustrating a form of a locking washer having spring tongues.

Referring to the accompanying drawings 10 and 11 denote material to be bolted together and 12 a bolt extended through alining openings in the material and formed with a threaded end which projects outwardly of the material 10. Around the threaded end of the bolt 12 a locking washer 14 is disposed, said washer being provided with tongues 16 formed by cutting slits 17 in the washer. The tongues 16 are adapted to engage a nut 18 which is threaded on the bolt 12. The washer 14 may be provided with a depressed portion 15 which is received in a recess formed in the material to be bolted against which said washer is disposed. It is understood that any other form of locking washer may be employed the one illustrated being particularly adapted for use in connection with the improved means for releasing the nut from the bolt.

The improved device for removing the nut from locked position comprises a sleeve 19 the bore of which is formed to snugly engage the nut 18 and which is formed hexagonal or of any other suitable shape in order to be engaged by a wrench. The sleeve 19 is formed with a concentric flange 20 projecting inwardly thereof so as to leave a circular opening 21.

At 22 is a second sleeve having a reduced end 23 which extends through the opening 21 and on the lower end of this reduced portion is a nut 24 which holds the second sleeve and the sleeve 19 together so that the one is rotatable with reference to the other. This sleeve 22 is threaded interiorly as at 25 and held in this threaded interior is a stem 26 provided at its lower end with a threaded recess 27 adapted to fit upon the bolt 12. The stem 26 is further provided with a reduced upper end 28 having a wrench receiving square 29 at its extremity. This stem 28 passes through a suitable opening in the top of the sleeve 22.

In applying the device the sleeve 19 is placed over the nut and the sleeve 22 rotated to bring the threaded recess 27 into engagement with the end of the bolt 12. This may be done, in case the stem 26 is not in proper position, by means of the end 29 so that the stem is rotated in the sleeve 22. After the stem 26 has been screwed upon the bolt the sleeve 22 is rotated still farther and this causes the sleeve 22 and the sleeve 19 to move down and the edge of the sleeve 19 engages and flattens out the locking tongues so that the nut may be rotated to remove the same from the bolt.

There has thus been provided a simple and efficient device of the kind described and for the purpose specified.

I claim:—

1. In a device for removing nuts, a sleeve adapted to engage a nut and be rotated therewith, said sleeve being of greater thickness than a nut, a sleeve secured to the first sleeve and formed with a threaded bore and a stem threaded in the second sleeve and formed on one end with a recess having a threaded wall to engage the threaded end of a bolt and a reduced upper end extended through the sleeve.

2. A device for removing nuts comprising a sleeve adapted to engage a nut and formed with an inwardly projecting flange, a second sleeve having a reduced end extended through the flange of the first sleeve, a nut threaded on the reduced end of the second sleeve and against the flange of the first sleeve, said second sleeve being formed with internal screw threads, a stem threaded on the internal screw threads of the second sleeve and formed on its lower end with a recess having a threaded wall to engage the threaded end of a bolt and a reduced extension on the other end projecting through the free end of the second sleeve.

In testimony whereof, I affix my signature, in presence of two witnesses.

WALTER H. CRILLEY.

Witnesses:
 LAWRENCE RHODES,
 N. E. RHOADES.

Copies of this patent may be obtained for five cents each, by addressing the "Commissioner of Patents, Washington, D. C."